United States Patent
Shapiro et al.

[11] Patent Number: 5,991,810
[45] Date of Patent: Nov. 23, 1999

[54] USER NAME AUTHENTICATION FOR GATEWAY CLIENTS ACCESSING A PROXY CACHE SERVER

[75] Inventors: Mark L. Shapiro, Los Altos; Anand Subramaniam, San Jose; Muthukumar Muthumavadi, Santa Clara, all of Calif.

[73] Assignee: Novell, Inc., Provo, Utah

[21] Appl. No.: 08/905,150

[22] Filed: Aug. 1, 1997

[51] Int. Cl.[6] ............................ G06F 17/30; G06F 15/00
[52] U.S. Cl. .................. 709/229; 709/202; 709/203; 709/217; 707/1; 707/9; 707/10; 713/202
[58] Field of Search .................... 395/609, 601, 395/610, 615, 187.01, 188.01; 709/229, 202, 203, 217; 707/1, 9, 10; 713/200, 201

[56] References Cited

U.S. PATENT DOCUMENTS

| | | | |
|---|---|---|---|
| 5,594,921 | 1/1997 | Pettus | 710/11 |
| 5,678,041 | 10/1997 | Baker et al. | 395/609 |
| 5,826,014 | 10/1998 | Coley et al. | 713/201 |
| 5,884,025 | 3/1999 | Baehr et al. | 713/201 |

OTHER PUBLICATIONS http://www.zdjournals.com/inw/news/nds.htm, Jul. 15, 1996.

*Primary Examiner*—Dung C. Dinh
*Assistant Examiner*—Quoc-Khanh Le

[57] ABSTRACT

A system and method for regulating access to a proxy cache server residing on an institutional intranet or local network provides a directory for storing user names that are appended to client requests for remote web site information. The proxy cache server reads the appended requests and either accepts or denies access to the requested information based upon predetermined access control guidelines relative to the specific user name. The access control guidelines can be stored on the directory, and down-loaded to the proxy cache server's memory as needed. The proxy cache server stores and retrieves requested site information via the Internet, but only retrieves and delivers requested site information to clients if authorization is approved.

17 Claims, 3 Drawing Sheets

5,991,810

USER NAME AUTHENTICATION FOR GATEWAY CLIENTS ACCESSING A PROXY CACHE SERVER

FIELD OF INVENTION

This invention relates to a system and method for limiting access by Internet Protocol (IP) and Novell's (of Provo, Utah) proprietary Internet Protocol (IPX) standard gateway clients to Internet web sites through a proxy cache server based upon the IPX/IP gateway client's username.

BACKGROUND OF THE INVENTION

It is increasingly common for users or "clients" having individual microcomputers interconnected by an institutional intranet or local area network to gain access to various remote sites (such as those on the "World Wide Web") via the well known Internet Communications Network. Clients, using stand-alone microcomputers with a user interface and a resident web browser application, receive and manipulate data from various web sites as desired. In a basic network communication arrangement, all clients are free to access any remote web sites for which Uniform Resource Locator (URL) addresses are available.

Additionally, it is increasingly common in network applications to provide the local network or intranet with a so-called proxy cache server that links the local network with the wider external Internet. The purpose of the proxy cache server is to store and distribute to clients information received from external web sites. The information, which can consist of a web page or associated data, can be accessed by local network clients without making a further connection to the external Internet. The proxy cache server accesses stored web pages based upon addresses provided by clients. These addresses are typically provided in Transmission Control Protocol/internet Protocol (TCP/IP) format, which is commonly recognized by the Internet. The local network, itself, can communicate using an IP protocol or the commercially available IPX protocol by Novell, Inc. of Provo, Utah. In an unregulated proxy cache server environment, request for new web site information cause the proxy cache server to communicate with the Internet, receive and download the newly requested information and store it for further use. Various parameters are used to regulate the length of time for which web site information is stored within the proxy cache server and for when information is deleted. In general, a proxy cache server reduces the number of times Internet connections must be made, particularly for popular, often-visited web sites.

In many institutional settings, unlimited access to web sites is undesirable. Similarly, it may be desirable to limit access to web site information to certain specified users and/or limit specified users to only certain types or categories of web sites. Applications resident in web servers are currently employed to restrict access to specified sites.

In general, however, proxy cache servers are not provided with applications for limiting access by certain users. Hence, all users on the network typically have access to any web site information stored within a proxy cache server. It is therefore, an object of this invention to provide a system and method for limiting access to web site information stored on a proxy cache server within a local area network or intranet. The arrangement should automatically restrict access by unauthorized users to specified web information stored in the proxy cache server and should prevent the proxy cache server from retrieving web site information via the Internet for such unauthorized users.

SUMMARY OF THE INVENTION

This invention overcomes the disadvantages of the prior art by providing a system and method for controlling access to remote (Internet) web information stored on a proxy cache server, wherein the proxy cache server is resident on a local network or intranet. Gateway clients linked to the local network or intranet can issue requests for web information—typically a Hypertext Transfer Protocol (HTTP) format through a web browser application. The HTTP request is not routed directly to an Internet server. Rather, a user name for the particular client is appended to the request's message header. The client previously obtains the user name through a network directory service. The appended request is then forwarded to the proxy cache server. The proxy cache server receives the request and polls for the user name. If the user name is absent, the request is denied. If the user name is present, then the proxy cache server passes the request to an access control agent that compares the name and requested site address to an access control list. The parameters of the access control list are preprogrammed by a system administrator based upon the institution's Internet access control policies. The proxy cache server permits access or denies access based upon the particular access limits associated with the requesting client and the parameters of the requested site. If access is permitted, then the proxy cache server transmits the requested site information to the client from its cache memory. If the requested site information is not currently stored in the cache, then the proxy cache server's application opens a TCP/IP link with the remote site over the Internet, retrieves the site information, stores it in the cache, and transmits the information from the cache to the client.

The directory service can be structured as a Novell Directory Services (NDS) directory. Communication between the NDS directory, client and proxy cache server can occur using data packets formatted according to Novell's IPX protocol over the local network or intranet. Data relative to access control can reside in the NDS directory, and can be organized according to a plurality of criteria such as user name, level of access, site categories, time of day restrictions, etc.

BRIEF DESCRIPTION OF THE DRAWINGS

The foregoing and other objects and advantages of the invention will become more clear with reference to the following detailed description as illustrated by the drawings, in which.

DETAILED DESCRIPTION OF ILLUSTRATIVE EMBODIMENT

Figure 1:
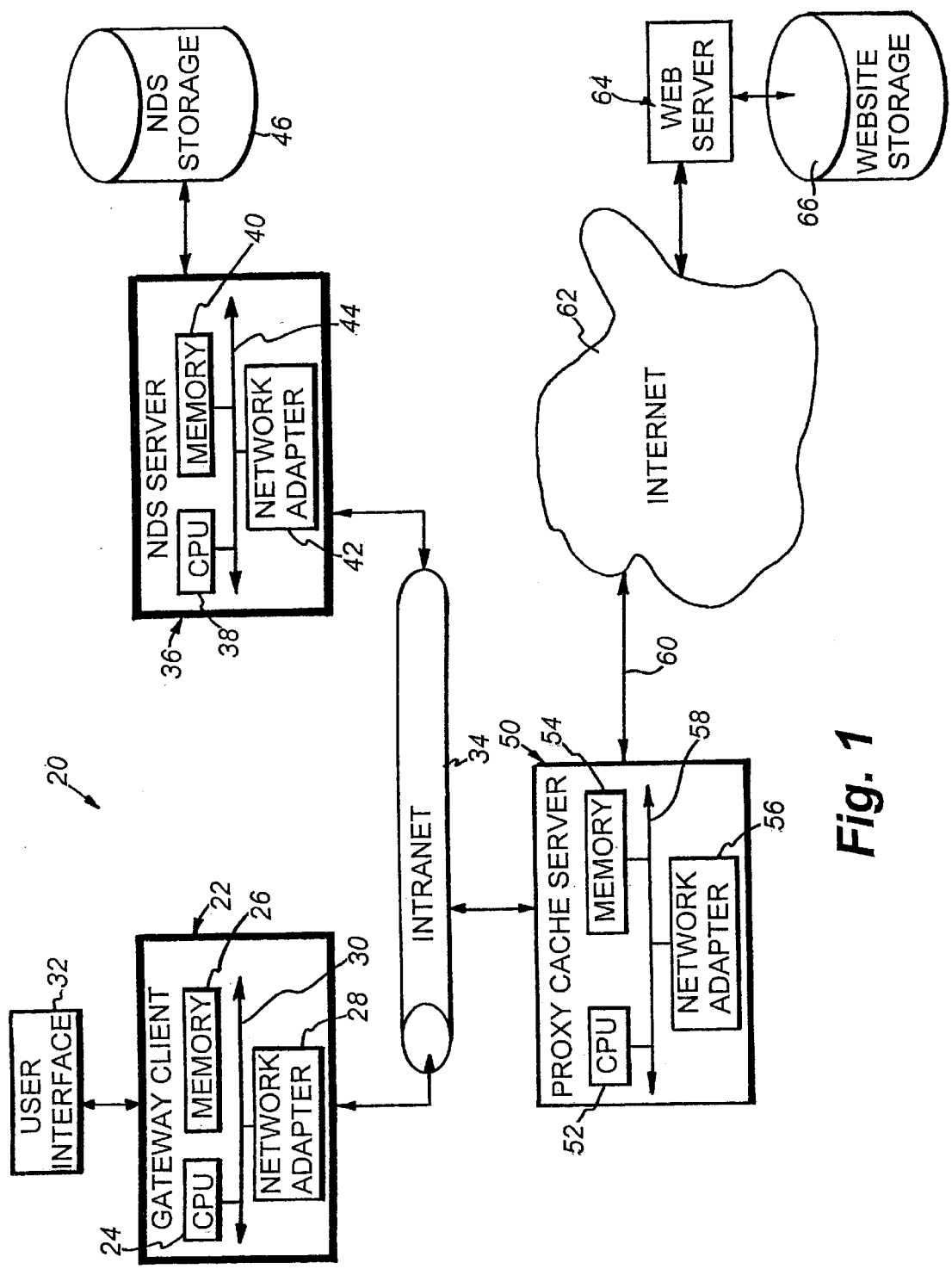
FIG. 1 is a network-architecture level block diagram of a network including a proxy cache server in which access by users to the proxy cache server is regulated.

FIG. 1 illustrates an architecture-level block diagram of a network having a proxy cache server according to this invention. The network 20 includes a plurality of gateway clients shown generally by the exemplary gateway client block 22. Each gateway client can comprise a stand-alone microcomputer having a Central Processing Unit (CPU) 24 a memory 26 and a network adapter 28 for communication, all linked by a bus 30. Each gateway client is linked with its own user interface 32 that allows data to be viewed and instructions to be transmitted. The user interface typically includes a keyboard, monitor and a screen-cursor manipulator, such as a mouse. The gateway client is linked to a local network or intranet 34. In this embodiment, it is contemplated that communication with the intranet is accomplished by transmitting and receiving data packets having header addresses provided in the IPX protocol available from Novell, Inc. of Provo, Utah. IP protocol can also be utilized. The intranet 34 is also linked with a Novell Directory Services (NDS) server 36, also commercially available from Novell, Inc. This server includes its own CPU 38, memory 40 and network adapter 42 linked by a bus 44. An associated data storage device such as a disk 46 is also linked to the server 36.

The NDS server 36 and storage device 46 store and distribute data related to client user names. Using proprietary data calls, described further below, the clients each poll the NDS server for their unique NDS username. The NDS name is used for further communication by the client once it is received over the intranet 34.

A proxy cache server 50 is also linked to the intranet 34. The proxy cache server also contains a CPU 52, memory 54 and network adapter 56 linked to a common bus 58. The proxy cache server includes a communications link 60 to the well known Internet communication network 62. The Internet consists of a large number of independent nodes and routers that enable the transfer of TCP/IP formatted data packets to and from a large number of remote sites. One such remote site consisting of a web server 64 is illustrated. The web server 64 includes its own associated data storage device such as a disk 66.

The proxy cache server 50 acts as a "firewall" between the external Internet 62 and the intranet 34. Requests for web site information are first routed from clients through the intranet 34 to the proxy server 50. If the client is authorized to request information from a particular web site, then the information is retrieved from the memory 54 (if it is already been cached in the memory) or it is, at that time, received from the web site for transfer to the client. New information is contemporaneously cached in the proxy cache server memory 54. The procedure by which access is accepted or denied by the proxy cache server is further described below.

Figure 2:
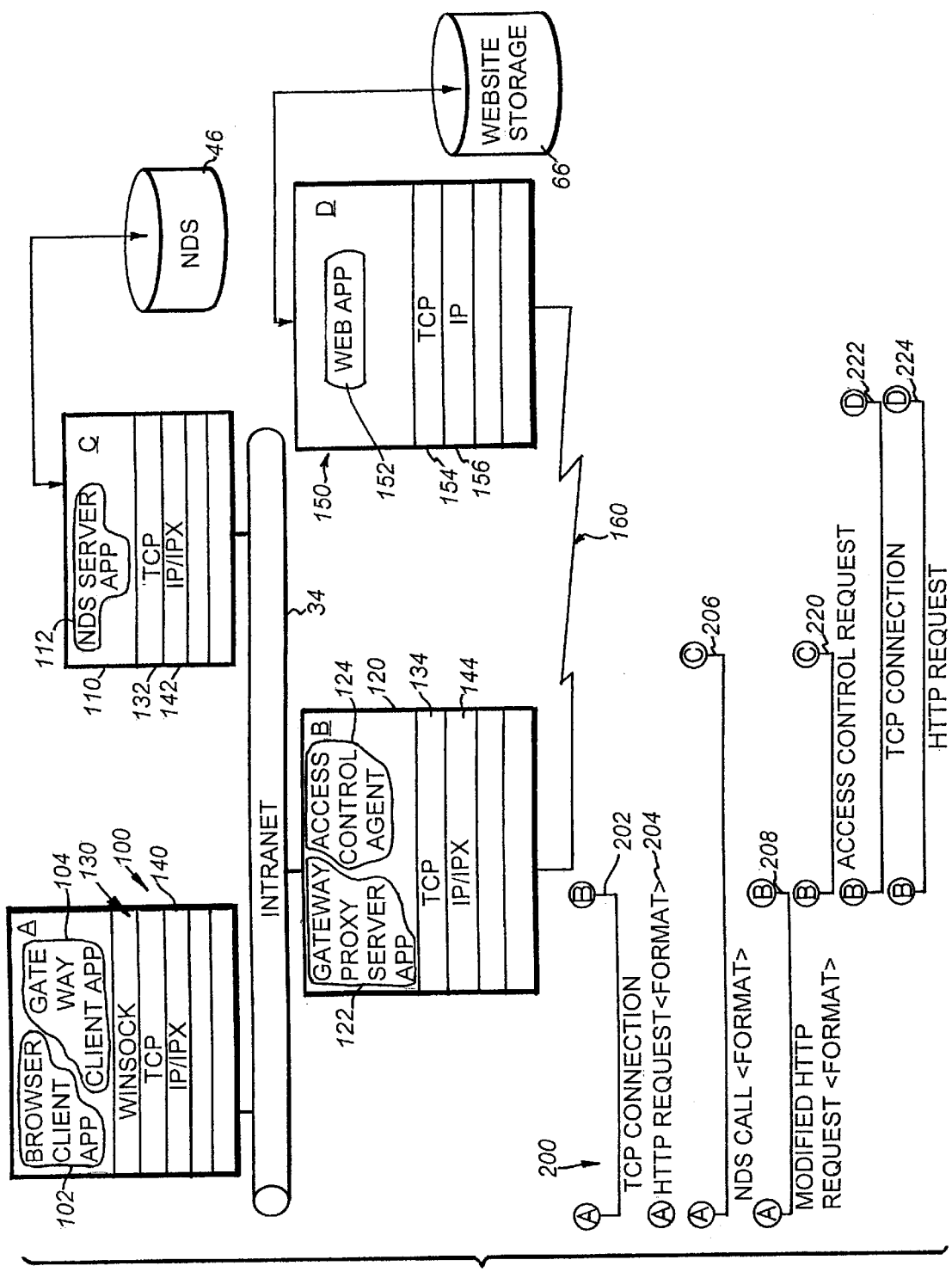
FIG. 2 is a communication-protocol level block diagram of the network of FIG. 1.

FIG. 2 illustrates a communication protocol stack organization for the network. The gateway client stack 100 includes a resident web browser application 102, such as the commercially available Netcape Navigator™ product that enables manipulation of web site information and a gateway client application and the dynamic-link library (DLL) of the well-known Windows® operating system application programming interface API), Windows Socket (WinSock) available from Microsoft Corp. of Redmond, Wash. 104 that enables communication through the intranet 34. The NDS stack 110 includes a resident NDS server application 112 that is commercially available from Novell, Inc.

The proxy cache server stack 120 includes a gateway proxy cache server application 122 and an access control agent application 124. The stacks 100, 110 and 120 each include respective TCP communication layers 130, 132 and 134 respectively. Likewise, each of the stacks 100, 110 and 120 include an IP and/or IPX communication layer 140, 142 and 144 respectively. Communication through the intranet occurs using IP or IPX addresses and TCP verification data packets that confirm to the sender receipt is of IP or IPX formatted data. packets to the recipient. The web site stack 150 generally include a web application 152. The web application can be responsible for formatting a web page and for communication. An associated TCP communication layer 154 and IP communication 156 are used to deliver information over an Internet link 160.

Reference is further made to the communication steps 200 detailed in FIG. 2. A TCP/IP connection is established between the browser client app (A) and the gateway proxy cache server (B) through the intranet 34 as shown in step 202. Establishment of a TCP/IP connection entails the prior configuration of various IP addresses, usually represented in a dotted decimal notation or dotted hexadecimal notation in each of the computers, routers, management stations and workstations currently resident on the network. Certain IP network numbers are reserved for use by particular aspect of TCP/IP communication. The address is provided as a header to a data packet sent between a sender and a recipient. Router functions within the intranet strip the header and delivered associated data within the packet (e.g., instructions and information) to the designated addressee/recipient. Additional sub-network addresses can be appended to the IP address to provide specific routing to a stand-alone machine or particular components of that machine. The recipient provides a TCP header for additional reliability. TCP headers, in combination with application layer data are usually termed a segment. The segment can include a variety of data that are returned to the sender to ensure that the original IP message was properly received.

The gateway client application issues a call to the NDS server (C) as shown in step 206.

The call from the gateway client application includes the NDS recognized command "WhoAmI." This command instructs the NDS server to retrieve an NDS format user name for the particular client user from storage 46 and to provide user name back to the gateway client application which passes it to WinSock.

The user of the client requests access to a particular Internetweb site address by issuing a Hypertext Transfer Protocol (HTTP) prefix through the gateway client browser application in step 204. The request is provided in a format recognizable as an Internet web site address, for example, "HTTP:\\www. Novell. com ."

The user name received from the NDS directory is appended to the HTTP request by the well-known Winsock Application Program Interface (API) to generate a modified request. The modified NDS request carries a header format "nwuser:<NDS username>\r\n\<original HTTP request>," where "NDS username" is a character string organized according to the NDS directory hierarchy. In general, the NDS username is a preprogrammed name generally provided based upon the particular context of the user. In other words, names are provided as part of an organizational tree. For example the name can consist of particular client, department and division within a company.

In the NDS format described above, "r" indicates a carriage return and "n" indicates a line feed, providing separation between the NDS "username" and the original HTTP request.

The modified HTTP request is transmitted by Winsock from the gateway client (A) to the proxy cache server (B) in step 208.

Upon receipt of the modified HTTP request by the proxy cache server, the gateway application 122 resident on the proxy cache server inspects the message for the NDS username header. If the NDS username string is absent, then access is immediately denied. This is a first level of firewall protection, since users must all be recognized by the NDS directory to be recognized by the proxy cache server.

Figure 3:
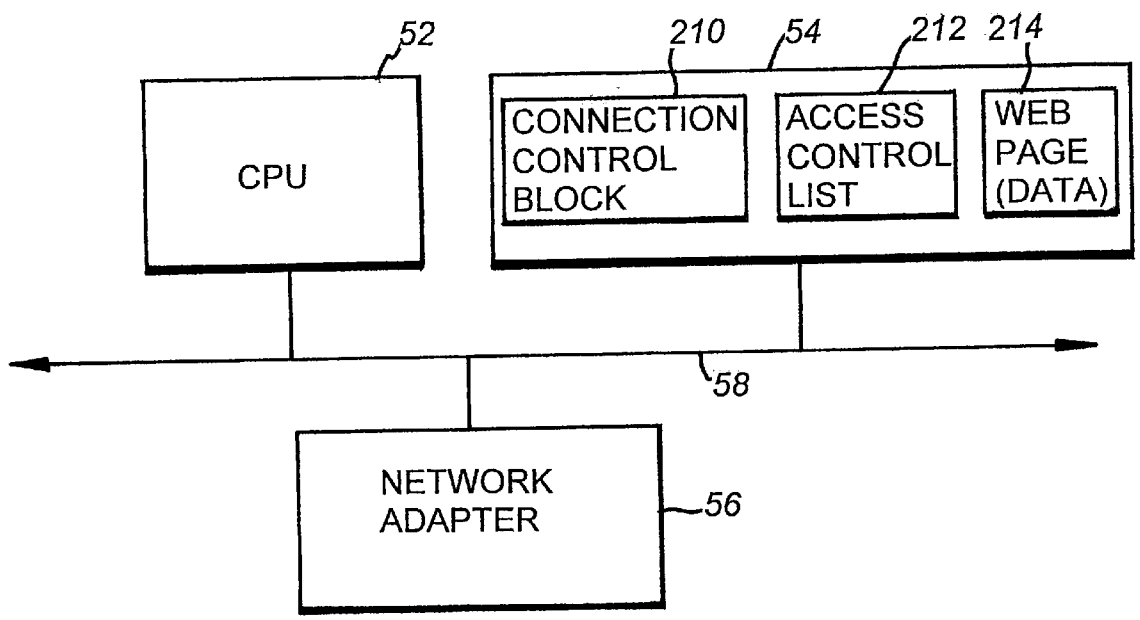
FIG. 3 is a more detailed block diagram of the proxy cache server of FIG. 1.
Figure 4:
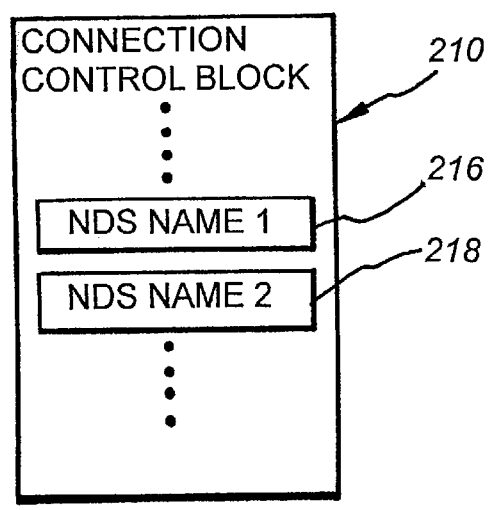
FIG. 4 is a more detailed block diagram of the connection control block for the proxy cache server of FIG. 3.

If the NDS username string is present, then the gateway application 122 passes the HTTP request to the proxy cache server's access control agent application 124. With further reference to FIGS. 3 and 4, the memory block 54 includes a connection control block 210, access control list 212 and the various web page data currently stored in the proxy cache server. The stripped NDS username is stored in the connection control block 210. A plurality of names 216 and 218 can be present in the connection control block 210 at any time, depending upon the number of users requesting information. The NDS directory node (C) stores information related to access by various NDS users. The access control agent 124 invokes Application Program Interface (API) data calls the NDS as shown in step 220 (FIG. 2).

The NDS stores access information in a variety of ways. Access control information is originally provided by the system administrator based upon applicable institutional access policies and is stored in the NDS. Typically, access information is passed to the proxy cache server's access control list 212 (FIG. 3) form the NDS as needed. A one-time read of the NDS access control list at predetermined times (e.g. daily) can occur according to one embodiment of this invention. The access control information is, thus, provided to appropriate memory locations in the proxy cache server for use by the access control agent. Within the proxy cache server's memory reside several access control look-up tables that are organized based upon such parameters as username, name of the destination's web site, IP address of the web site, time of day, particular characteristics in the web site's URL name and whether or not the particular user has web access.

Based upon a comparison of the username and the HTTP request data to the access control list, the access control agent 124 decides whether access is to be permitted or denied. If access is denied, then the client is notified of the denial by message block returned through the intranet 34. If, however, access is allowed, then the proxy cache server examines its web page data block 214 in memory 54 to determine whether the requested information is currently cached. The information is indexed according to HTTP format addresses. Hence the memory recognizes valid HTTP requests and retrieves requested information based upon this format. If the requested information is not currently cached, then a TCP connection is established over the Internet link 160 in step 222 with the web site (D). The HTTP request is routed through the Internet link 160 from the proxy cache server (B) to the web site (D) in an IP format. The NDS format header is stripped from the request prior to transmission.

Information stored at the web site (D) is retrieved upon receipt of an HTTP request from the proxy cache server (B) in step 224. Information retrieved from a web site is cached in the web page data block 214 for future access by other clients.

Of course, if the requested information is already contained within the web page data block 214 of the proxy cache server, then no call to the remote web site is made. Rather, upon authorization by the access control agent, the stored web page information is routed over the intranet 34 the requesting client to the requesting client.

In general, the proxy cache server automatically stores web page data whenever a valid request for such data is made and such data is received from a remote site. All further request for data that are authorized are handled by data stored within the proxy cache server web page data block 214, minimizing unnecessary calls over the Internet link 160. Web page information is often provided with expiration dates. The proxy cache server polls for expired web page data and, otherwise, deletes data based upon a variety of predetermined parameters. For example, if a predetermined time period elapses after data is initially requested, the data maybe deleted. This helps to ensure that the most current web page data is stored within the block 214 and that the block 214 is not cluttered with infrequently-accessed data.

The foregoing has been a detailed description of a preferred embodiment of the invention. Various modifications and additions can be made without departing from the spirit and scope of the invention. For example, while an NDS server is utilized, it is contemplated that a variety of systems and organizational structures can be substituted. Appropriate access control can be established based upon those identifiers. In particular, access control can be administered directly based upon IP and/or IPX addresses of clients rather than NDS username in an alternate embodiment. Accordingly, this description is meant to be taken only by way of example, and not to otherwise limit the scope of the invention.

What is claimed is:

1. A method for controlling access by clients to information stored in a proxy cache server linked with a remote site comprising the steps of:

establishing at the client a request for transfer of information from the remote site to the client, wherein the transfer request is in a format recognized by the remote site;

intercepting the request at a gateway and generating a modified request data structure from the transfer request including appending a header to the transfer request, the header having a predetermined user name associated with the client, the step of intercepting further including accessing a directory service server and transmitting to the proxy cache server the modified transfer request, the header being obtained by accessing the directory service server and being formatted according to a directory service user name hierarchy that is arranged to comprise a character string including a plurality of identifiers that define a context of the client within a client organizational structure having a plurality of levels of clients;

reading the modified request at the proxy cache server and determining whether access to the requested information is permitted or denied based upon predetermined access parameters; and retrieving permitted information from a memory location in the proxy cache server and transmitting the information to the client.

2. The method as set forth in claim 1 wherein the step of retrieving includes establishing a communication link with the remote site, retrieving information from the remote site and storing the information in the memory location of the proxy cache server.

3. The method as set forth in claim 1 further comprising retrieving, at predetermined times, access control information from the directory service server, the access control information including access parameters associated with predetermined remote sites and allowed access to predetermined remote sites based upon the context of the client.

4. The method as set forth in claim 1 wherein the step of accessing the network directory service server further comprises providing the directory service server with an initial request for identity of the client, and retrieving therefrom the user name.

5. The method as set forth in claim 4 wherein the step of appending includes inserting a separating character set between the header and the transfer request.

6. The method as set forth in claim 5 wherein the step of inserting further includes providing a carriage return character and a line feed character in the separating character set.

7. The method as set forth in claim 1 wherein the step of establishing a request includes establishing a transfer request that defines a hypertext transfer protocol request.

8. A system for controlling access by clients to information stored in a proxy cache server linked with a remote site comprising:

a proxy cache server that caches predetermined information received from remote sites in a cache memory;

a gateway client for routing an application transfer request for information from the remote site, the transfer request being in a format recognized by the remote site, the gateway including a means for intercepting the transfer request, prior to routing, and a means for generating a modified transfer request by appending a predetermined user name header associated with the gateway client to the transfer request, the means for intercepting further including means for accessing a directory service server and for transmitting to the proxy cache server the modified transfer request, the header of the modified transfer request residing in the directory service server and being formatted according to a directory service user name hierarchy that is arranged to comprise a character string including a plurality of identifiers that define a context of the client within a client organizational structure having a plurality of levels of clients;

means, in the proxy cache server, for determining whether access to the requested information is permitted or denied based upon predetermined access parameters associated with the remote site and the context of the client; and means, in the proxy cache server, for transmitting information from the cache memory to the gateway client based upon the means for determining.

9. The system as set forth in claim 8 wherein the proxy cache server further comprises means for retrieving and for caching the requested information from the remote site when the requested information is absent from the cache memory.

10. The system as set forth in claim 9 further comprising a remote directory node that stores a predetermined user name associated with the gateway client, and wherein the means for generating the modified request includes a means for retrieving the predetermined user name from the directory node.

11. The system as set forth in claim 8 wherein the remote site comprises a web server linked with the Internet.

12. The system as set forth in claim 8 wherein the predetermined access parameters are located at the directory node and the means for determining includes means for accessing the directory node at predetermined times.

13. The system as set forth in claim 8 further comprising means for retrieving, at predetermined times, access control information from the directory service server, the access control information including access parameters associated with predetermined remote sites and allowed access to predetermined remote sites based upon the context of the client.

14. The system as set forth in claim 8 wherein the means for accessing the network directory service server further comprises means for providing the directory service server with an initial request for identity of the client, and retrieving therefrom the user name.

15. The system as set forth in claim 14 wherein the modified transfer request includes a separating character set between the header and the transfer request.

16. The system as set forth in claim 15 wherein the separating character set includes a carriage return character and a line feed character.

17. The system as set forth in claim 8 wherein the transfer request defmes a hypertext transfer protocol request.

* * * * *